United States Patent [19]

Rice

[11] 4,130,227

[45] Dec. 19, 1978

[54] SPARE WHEEL AND TIRE LOCKING MOUNT FOR PICKUP TRUCKS

[76] Inventor: Donald R. Rice, 334 E. Butler La., Ashland, Oreg. 97520

[21] Appl. No.: 803,158

[22] Filed: Jun. 3, 1977

[51] Int. Cl.² .............................................. B62D 43/08
[52] U.S. Cl. ............................ 224/42.24; 224/42.45 R; 224/42.46 R
[58] Field of Search ............... 224/42.24, 42.25, 42.12, 224/42.15, 42.16, 42.23, 42.33, 42.37, 42.41, 42.45 R, 42.46 R, 29 R, 45 P; 16/114 R; 294/93; 248/503, 532; 211/23

[56] References Cited

U.S. PATENT DOCUMENTS

| 3,204,840 | 9/1965 | Bowen | 224/42.24 |
| 3,613,972 | 10/1971 | Daughhetee | 224/42.24 |
| 3,979,035 | 9/1976 | Huot | 224/42.25 X |

Primary Examiner—Trygve M. Blix
Assistant Examiner—Jerold M. Forsberg
Attorney, Agent, or Firm—Clarence M. Crews

[57] ABSTRACT

Locking means are provided for conveniently and dependably securing a spare wheel and tire assembly in a theft-proof manner to a tray wall of a pickup truck, without modification of the truck structure. No tools are required for installing the locking means.

2 Claims, 5 Drawing Figures

U.S. Patent
Dec. 19, 1978
4,130,227
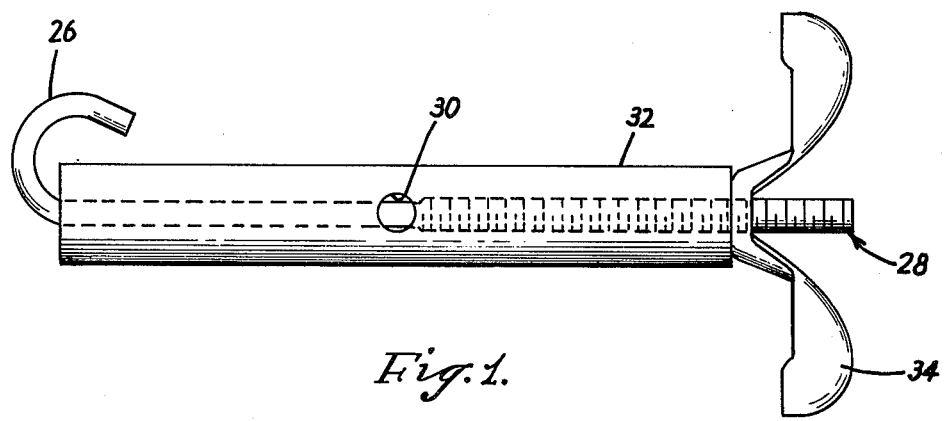
Fig. 1.
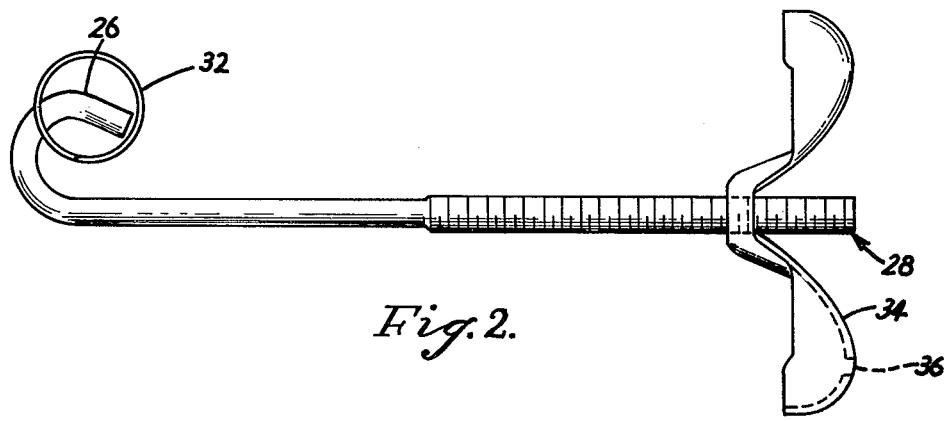
Fig. 2.
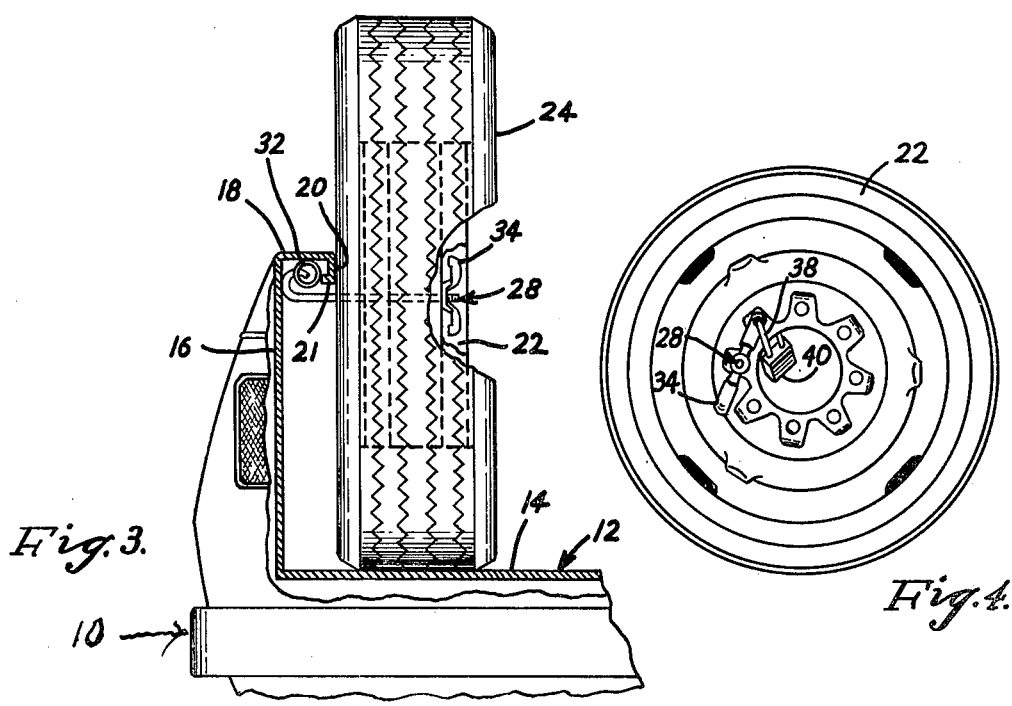
Fig. 3.
Fig. 4.

SPARE WHEEL AND TIRE LOCKING MOUNT FOR PICKUP TRUCKS

This invention relates to means for conveniently securing a spare wheel and tire assembly to a tray side wall of a pickup truck in a theft-proof manner, and this without resort to any installing tools.

In a passenger car a spare wheel with a tire mounted on it may be lodged in a locked trunk and may, itself, be conveniently locked in place, if desired, in a thoroughly theft-proof manner.

In a pickup truck, however, there is no trunk, and a spare wheel and tire organization is commonly carried loosely in the truck tray, freely exposed to theft and likely to be covered and rendered inaccessible by cargo.

Alternatively, the wheel and tire may be conventionally attached to the underside of the truck tray —a very clumsy, tiring and time consuming arrangement.

It is the object of the present invention to improve upon such arrangements by providing for the securement and locking of a spare tire carrying wheel in a theft-proof manner to a side wall of a pickup tray.

Conventionally a pickup tray, at its four corners, is bounded laterally by upstanding side walls having inturned flanges of moderate width. At their inner extremities the inturned flanges have downturned flanges. The downturned flanges at their lower extremities, have narrow outturned lips, which lips are availed of by me at any selected corner of the tray for securing a wheel and tire combination securely and safely in place.

It is a further object to achieve this kind of result without any change of the vehicle itself. There is no need to drill holes. Neither is there any need for welded joints which might fail.

To this end provision is made of (a) a tubular member adapted to fit beneath the inturned flange and to bear downward and inward against the outturned lip of a tray side, and having intermediate its ends, preferably midway of its length, a hole of substantial diameter, (b) a hook member adapted to have its hook portion fitted detachably into the hole of the tubular member and having a long, straight, threaded shank adapted to be passed inward through a bolt bore of a spare wheel, (c) a wing nut having long arms, adapted to be threaded onto the inner straight end of the hook member, and (d) a padlock that secures one arm of the wing nut, and hence the wing nut itself, against turning.

The four parts thus assembled are adapted to hold a spare wheel and a tire carried by the wheel firmly and fixedly, but releasably, in place. It is a further feature, however, that the padlock having a long, pivoted U-shaped keeper member is adapted to have the free arm of the keeper member passed through a bolt bore of the wheel other than the one through which the shank of the hook member is passed, and then sprung into a locked condition.

It is a still further feature that the wheel mounting and locking device, when inactive, may have the shank of the hook member passed through the sleeve member and secured therein by application of the wing nut. The hook member is made just a little longer than the sleeve so that when the wing nut is threaded tight the tip of the hook is spaced slightly from the sleeve. By virtue of this arrangement the locking device may conveniently be hooked onto the belt or a pocket of the user while the wheel and tire are being put into place.

Other objects and advantages will hereinafter appear.

In the drawing forming part of this specification,

FIG. 1 is a view in side elevation showing the relation of the hook, sleeve and wing nut to one another when not in use;

FIG. 2 is a view in side elevation showing the relationship of the same parts when applied to a pickup tray;

FIG. 3 is a vertical sectional view, partly broken away, showing a spare tire and wheel affixed and locked to a pickup tray; and FIG. 4 is a fragmentary face view of the wheel, showing how the lock is applied.

In FIG. 3 a fragment 10 of a pickup tray is shown, partly in section and partly broken away, with a spare wheel, having a spare tire mounted on it, and secured in place. The details of pickup construction are generally routine and require no detailed description, aside from the fact that the pickup 10 includes a metallic tray 12 having a bottom 14, vertical side walls 16, inturned flanges 18 at the upper extremities of the side walls, downturned flanges 20 at the inner extremities of the flanges 18, and outturned lips 21 at the lower extremities of the flanges 20.

In accordance with the invention, advantage is taken of the location at a convenient height of the inturned flange 18, the downturned flange 20, and the outturned lip 21 for mounting a spare wheel 22 and a spare tire 24 in a theft-proof manner.

The wheel 22, of course, has a comparatively large circular center opening for mounting on an axle, which opening is surrounded at equal, standard intervals by holes for the reception of attaching bolts when the wheel is secured in operative position upon a vehicle axle. Because these holes are eccentrically located, any selected one can, through rotation of the wheel, be disposed at a chosen appropriate height just under the flange 18 as illustrated in FIG. 3.

When a wheel 22 having a tire 24 mounted on it is to be affixed to the vehicle tray as illustrated in FIG. 3, the curved end 26 of a hook 28 is fitted through a hole 30 formed in the side of a sleeve 32, desirably midway of the length of the sleeve. The straight shank of the hook is then passed through the selected bolt hole of the wheel 22 and the wheel, with the tire 24 touching the bed of the pickup, is turned to locate the sleeve 32 in a position like that illustrated in FIG. 3. A wing nut 34 is then threaded onto the straight threaded shank of the hook 28 to press the sleeve 32 firmly against the flange 18 and the lip 21.

As thus far described the spare wheel and tire would be firmly held in place, but it is desirable that they be so held in a theft-proof manner. To this end, the wing nut 34 is made with long arms and one of the arms is formed with an opening for reception of the keeper 38 of a padlock 40. The U-shaped keeper, before being locked, is free to turn about one of its arms as an axis so that the other arm can be passed through a bolt hole other than the bolt hole through which the member 28 is passed. The padlock can be adjusted to a locked condition for protecting the wheel and tire against theft, and can be unlocked by an appropriate key.

It is a feature that the hook 28 is of substantially the same length as the combined lengths of the sleeve 32 and the wing nut 34 when the parts are related as shown in FIG. 1, so that the device can be conveniently carried in a pocket of the vehicle. It is also a feature that when the parts are detached from the wheel and related as shown in FIG. 1 the terminal portion 26 of the hook 28 is spaced a short distance from the sleeve 32. By virtue of this relationship the hook can be caught over the margin of a pocket or a belt to keep the implement conveniently at hand while the tire and wheel are being put into place.

I have described what I believe to be the best embodiment of my invention. What I desire to cover by letters patent, however, is set forth in the appended claims.

I claim:

1. A three-piece spare wheel mounting device for use in a pickup truck that has a wide wall surmounted by an inturned flange which continues as a downturned flange, and terminates in an outturned lip to form a sleeve receiving channel, which device includes, in combination,
    (a) a hooked member having a terminal hook portion and a straight threaded terminal shank portion, which shank portion is adapted to be passed through a bolt hole of a spare wheel,
    (b) a clamping sleeve which is distinct from the hooked member and which has a side opening capable of receiving the hooked end of the hooked member and of bearing laterally against the outturned terminal lip of the side wall of the truck, and
    (c) a wing nut adapted to be threaded onto the straight threaded terminal shank of the hooked member for engagement with the inner face of the wheel, the construction and arrangement being such that the shank of the hook member can be freely passed completely through the sleeve from end to end and so secured at one end by the wing nut, with the hook protruding outside the sleeve and spaced slightly from it to provide a convenient means for hanging the device from the belt or waistband of the installing mechanic while the wheel is being carried to the truck and set in place.

2. A spare wheel mounting device as set forth in claim 1 which further includes a key operated padlock having a keeper part adapted to be passed through an opening in the wing nut and through an otherwise unoccupied bolt hole of the wheel for securing the wheel against unauthorized removal.

* * * * *